United States Patent
Kotary et al.

(10) Patent No.: US 10,248,428 B2
(45) Date of Patent: Apr. 2, 2019

(54) SECURELY BOOTING A COMPUTING DEVICE

(71) Applicant: INTEL CORPORATION, Santa Clara, CA (US)

(72) Inventors: Karunakara Kotary, Portland, OR (US); Nicholas J. Yoke, Tigard, OR (US); Brett P. Wang, Shanghai (CN); Genliu Xing, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 11 days.

(21) Appl. No.: 15/300,086

(22) PCT Filed: Apr. 28, 2014

(86) PCT No.: PCT/CN2014/076348
§ 371 (c)(1),
(2) Date: Sep. 28, 2016

(87) PCT Pub. No.: WO2015/165000
PCT Pub. Date: Nov. 5, 2015

(65) Prior Publication Data
US 2017/0147356 A1    May 25, 2017

(51) Int. Cl.
*G06F 9/4401* (2018.01)
*G06F 21/57* (2013.01)
(Continued)

(52) U.S. Cl.
CPC ............ *G06F 9/4401* (2013.01); *G06F 3/065* (2013.01); *G06F 3/068* (2013.01); *G06F 3/0619* (2013.01);
(Continued)

(58) Field of Classification Search
None
See application file for complete search history.

(56) References Cited

U.S. PATENT DOCUMENTS 6,735,696 B1   5/2004  Hannah
7,757,098 B2   7/2010  Brannock et al.
(Continued)

FOREIGN PATENT DOCUMENTS

CN   101404014   4/2009
CN   102325025   1/2012
(Continued)

OTHER PUBLICATIONS

International Search Report and Written Opinion for Application No. PCT/CN2014/076348, dated Feb. 11, 2015, 13 pages.
(Continued)

*Primary Examiner* — Kaveh Abrishamkar
(74) *Attorney, Agent, or Firm* — Barnes & Thornburg LLP

(57) ABSTRACT

Technologies for securely booting a computing device includes a security engine of the computing device that consecutively determines a hash value for each block of initial boot firmware and generates an aggregated hash value from the hash value determined for each of the blocks. A processor of the computing device determines whether the aggregated hash value matches a reference checksum value. Initialization of the processor is completed in response to a determination that the aggregated hash value matches the reference checksum value. In some embodiments, the security engine consecutively retrieves each block of the initial boot firmware from a memory of the computing device, stores each retrieved block in a secure memory of the security engine, and determines the hash value for each stored block. Each block stored in the secure memory is copied to a portion of a cache memory of the processor initialized as Cache as RAM.

25 Claims, 5 Drawing Sheets

(51) Int. Cl.
*G06F 21/72* (2013.01)
*G06F 3/06* (2006.01)
*G06F 12/14* (2006.01)
*H04L 9/32* (2006.01)

(52) U.S. Cl.
CPC ........ *G06F 12/1408* (2013.01); *G06F 21/575* (2013.01); *G06F 21/72* (2013.01); *H04L 9/3242* (2013.01); *G06F 2212/1052* (2013.01)

(56) References Cited

U.S. PATENT DOCUMENTS

| | | |
|---|---|---|
| 8,560,823 B1 | 10/2013 | Aytek et al. |
| 2005/0204155 A1 | 9/2005 | Ravi |
| 2006/0179302 A1 | 8/2006 | Hatakeyama |
| 2008/0022108 A1 | 1/2008 | Brannoke et al. |
| 2009/0249050 A1* | 10/2009 | Datta ............... G06F 21/57 713/1 |
| 2015/0227744 A1* | 8/2015 | Horovitz ............ G06F 21/57 726/22 |
| 2016/0099809 A1* | 4/2016 | Krten ............... H04L 9/3236 713/168 |
| 2017/0003956 A1* | 1/2017 | Chang ............... G06F 8/654 |

FOREIGN PATENT DOCUMENTS

| | | |
|---|---|---|
| CN | 102325025 A | 1/2012 |
| CN | 103679004 | 3/2014 |
| EP | 0849657 | 6/1998 |

OTHER PUBLICATIONS

Office Action, Search Report, and English Translation of R.O.C. Patent Application No. 104109408, dated Mar. 9, 2016, 12 pages.
Office Action for R.O.C. Patent Application No. 104109408, dated Sep. 30, 2016, 4 pages.
International Preliminary Report on Patentability for Application No. PCT/CN2014/076348, dated Nov. 10, 2016, 7 pages.
First Office Action in Chinese Patent Application No. 201480077635.X, dated Sep. 20, 2018, including machine translation (10 pages).
Extended European Search Report for European patent application No. 14890700.9, dated Nov. 9, 2017 (7 pages).

* cited by examiner

SECURELY BOOTING A COMPUTING DEVICE

CROSS REFERENCE TO RELATED APPLICATIONS

This application is a national stage entry under 35 USC § 371 (b) of International Application No. PCT/CN2014/076348, which was filed Apr. 28, 2014.

BACKGROUND

One aspect of computer security involves protecting computer systems from malicious software, also known as "malware." Malware comes in many forms; however, many common varieties of malware perform writes or other accesses to unauthorized locations in computer memory. For example, certain malware attacks low-level system code (e.g., platform initialization firmware, boot loaders, operating system kernels, etc.) during initial stages of the booting process. Such attacks may be used by so-called "bootkits" or "rootkits" to gain control of a system and evade detection.

Typical computer systems attempt to detect and prevent execution of malware by performing a "secure boot" or "secure launch." To do so, computing systems may include a security engine or security coprocessor configured to verify the integrity of low-level system code prior to being loaded during the booting process. For example, upon initialization of the booting process, the security engine of a computing system may generate a hash of the firmware needed for initializing the main processor of the computing system. Subsequently, the security engine may compare that hash to a known good hash or checksum value corresponding to an unadulterated version of the firmware. If the two hashes are determined to be a match, the firmware may be permitted to be executed causing the main processor or other components of the computing system to be initialized.

Embedded and system-on-a-chip (SoC) systems are becoming more prevalent in the computing ecosystem. In typical SoC systems, the secure boot process is managed by an integrated security engine or security coprocessor having its own static random-access memory (SRAM) embedded in the SoC. To ensure a secure boot from the ground up, low-level system code must be verified by the integrated security engine prior to being permitted to be executed. Typically, such low-level system code must first be stored in the SRAM of the integrated security engine. Accordingly, the size of any low-level system code that is to be verified by the integrated security engine is effectively limited by the size of SRAM embedded into the SoC. In addition, increasing the total size of the SRAM on the SoC to enable the verification of larger-sized low-level system code is typically impractical due to the associated cost, die size, and power consumption of additional SRAM banks on the SoC.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
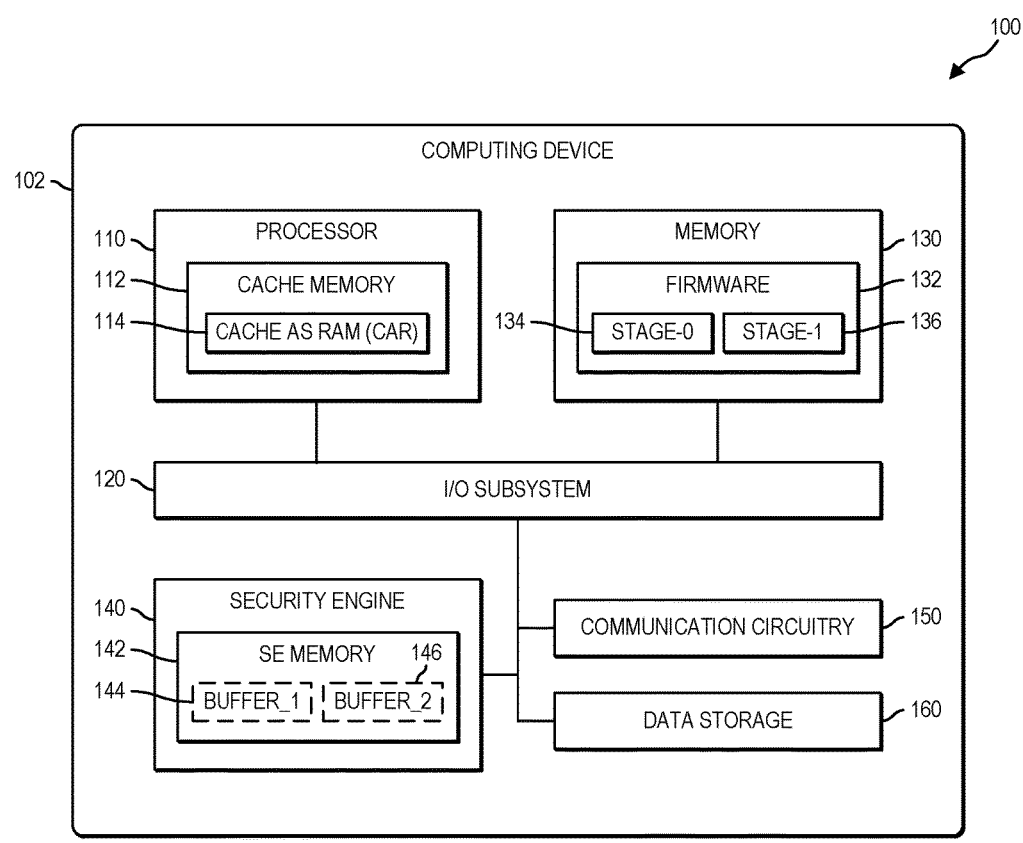
FIG. 1 is a simplified block diagram of at least one embodiment of system for using a computing device to perform a secure boot.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for performing a secure boot includes a computing device 102. In use, a security engine 140 of the computing device 102 retrieves and authenticates platform initialization firmware 134 (e.g., STAGE-0 firmware 134) stored in a memory 130 of the computing device 102. A processor 110 of the computing device 102 may execute the authenticated platform initialization firmware 136 to initialize a portion of a cache memory 112 of the processor 110 as Cache as RAM (CAR) 114. The memory 130 of the computing device 102 may also store initial boot firmware 136 (e.g., STAGE-1 firmware 136), which may be required to complete initialization (e.g., booting, etc.) of the processor 110. In some embodiments, the total storage size of the initial boot firmware 136 may exceed the amount of storage capacity available in a secure memory 142 of the security engine 140. In such embodiments, the initial boot firmware 136 may be broken up into multiple blocks (e.g., segments, blobs, portions, subsets, etc.), each of which may be retrieved from the memory 130 by the security engine 140 and subsequently stored in the secure memory 142. The security engine 140 may determine a hash value for each retrieved block of initial boot firmware 136 stored in the secure memory 142. After generating the hash value for a retrieved block of initial boot firmware 136, the security engine 140 may copy that block to the CAR 114 initialized in the cache memory 112 of the processor 110. In some embodiments, the processor 110 instead of the security engine 140 may copy each block of initial boot firmware 136 to the CAR 114. An aggregated hash value may be generated by the security engine 140 based on the hash values determined for each of the retrieved blocks of initial boot firmware 136. The aggregated hash value may be compared to a reference hash value or checksum value corresponding to a known hash value for an original or unadulterated version of the initial boot firmware 136. Processor initialization may be completed in response to a determination that aggregated hash value matches the reference hash value. In some embodiments, one or more security functions may be performed in response to determining that the aggregated hash value does not match the reference hash value. It should be appreciated that by breaking the initial boot firmware 136 (e.g., STAGE-1 firmware 136) into multiple blocks, consecutively storing each block in the secure memory 142, and copying each block from the secure memory 142 to the CAR 114 after generation of a hash value, the total storage size of the initial boot firmware 136 (e.g., STAGE-1 firmware 136) may exceed the amount of storage capacity available in a secure memory 142 of the security engine 140. That is, the amount of storage capacity of the secure memory 142 of the security engine 140 does not limit the total storage size of the initial boot firmware 136 (e.g., STAGE-1 firmware 136).

In some embodiments, the secure memory 142 of the security engine 140 includes multiple buffers 144, 146 (e.g., BUFFER_1 144 and BUFFER_2 146). In such embodiments, the security engine 140 may retrieve an initial block (e.g., a first block) of the initial boot firmware 136 (e.g., STAGE-1 firmware 136) from the memory 130 and store that block in a buffer 144 (e.g., BUFFER_1 144) of the secure memory 142. Contemporaneous with determining the hash value for the initial block (e.g., the first block), the security engine 140 may retrieve the next block (e.g., a second block) of the initial boot firmware 136 (e.g., STAGE-1 firmware 136) from the memory 130 and store that block in another buffer 146 (e.g., BUFFER_2 146) of the secure memory 142. Upon determining the hash value of the initial block, the security engine 140 or the processor 110 may copy that block to the CAR 114 initialized in the cache memory 112 of the processor 110. In such embodiments, the security engine 140 may continue retrieving additional blocks of the initial boot firmware 136 and storing them in one of the buffers 144, 146 in an alternating fashion based on which buffer 144, 146 is available (e.g., the previous block has been copied out of a buffer 144, 146 and into the CAR 114). As discussed, by breaking the initial boot firmware 136 (e.g., STAGE-1 firmware 136) into multiple blocks, consecutively storing each block in the secure memory 142, and copying each block from the secure memory 142 to the CAR 114 after generation of a hash value, the total storage size of the initial boot firmware 136 (e.g., STAGE-1 firmware 136) may be larger than the amount of storage capacity available in the secure memory 142 of the security engine 140.

The computing device 102 may be embodied as, or otherwise include, any type of computing device capable of performing the functions described herein including, but not limited to a desktop computer, a laptop computing device, a server computer, a consumer electronic device, a mobile computing device, a mobile phone, a smart phone, a tablet computing device, a personal digital assistant, a wearable computing device, a smart television, a smart appliance, and/or other type of computing device. The illustrative computing device 102 includes a processor 110, a memory 130, an input/output (I/O) subsystem 120, a security engine 140, communication circuitry 150, and a data storage 160. Of course, the computing device 102 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. The processor 110 may include cache memory 112 for storing instructions and/or data for execution. In some embodiments, as discussed in more detail below, a portion of the cache memory 112 may be initialized as Cache as RAM (CAR) 114. In such embodiments, the CAR 114 may be used by components of the computing device 102 to store data and/or variables needed during the booting process before the memory 130 (e.g., the main device memory) has been initialized. For example, in some embodiments, the processor 110 may copy (e.g., retrieve, move, relocate, obtain, etc.) one or more blocks of the initial boot firmware 136 (e.g., STAGE-1 firmware 136) from the secure memory 142 of the security engine 140 and into the CAR 114 for storage.

The memory 130 may be embodied as any type of volatile or non-volatile memory or data storage capable of performing the functions described herein. In operation, the memory 130 may store various data and software used during operation of the computing device 102 such as operating systems, applications, programs, libraries, and drivers. The memory 130 is communicatively coupled to the processor 110 via the I/O subsystem 120, which may be embodied as circuitry and/or components to facilitate input/output operations with the processor 110, the memory 130, and other components of the computing device 102. For example, the I/O subsystem 120 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SoC) and be incorporated, along with the processor 110, the memory 130, and other components of the computing device 102, on a single integrated circuit chip.

In some embodiments, the memory 130 includes firmware 132 configured to facilitate booting or otherwise initializing a platform and/or operating system (OS) of the computing device 102. The firmware 132 may be embodied as hardware components, software components, or a combination thereof (e.g., system firmware, system initialization data, etc.). In some embodiments, the firmware 132 includes low-level system code that when executed by the processor 110 and/or the security engine 140, causes one or more components of the computing device 102 to be initialized and/or one or more platform initialization functions to be performed. For example, in some embodiments, the firmware 132 includes platform initialization firmware 134 (e.g., STAGE-0 firmware 134), which when executed by the processor 110, causes the processor 110 to initialize a portion of the cache memory 112 as CAR 114. Additionally, in some embodiments, execution of the platform initialization firmware 134 (e.g., STAGE-0 firmware 134) may cause the processor 110 to copy (e.g., retrieve, move, relocate, obtain, etc.) one or more blocks of initial boot firmware 136 (e.g., STAGE-1 firmware 136) from the secure memory 142 of the security engine 140 and into the CAR 114 after generation of a corresponding hash value. In some embodiments, the firmware 132 also includes the initial boot firmware 136 (e.g., STAGE-1 firmware 136), which when executed, causes the processor 110 to complete its initialization process. It should be understood that during execution of the platform initialization firmware 134 (e.g., STAGE-0 firmware 134), the processor 110 may not be fully operational (e.g., functional). That is, the processor 110 may include basic and/or reduced functionality as defined by the platform initialization firmware 134. As discussed below, full functionality of the processor 110 may be enabled after execution of the initial boot firmware 136 (e.g., STAGE-1 firmware 136). It should be appreciated that in some embodiments, the platform initialization firmware 134 may be embodied as a STAGE-0 boot loader and the initial boot firmware 136 may embodied as a STAGE-1 boot loader.

The security engine 140 may be embodied as any hardware component(s) or circuitry capable of performing the functions described herein. In some embodiments, the security engine 140 may be embodied as a security coprocessor or microcontroller capable of operating independently of the processor 110, regardless of the operational state of the processor 110 (e.g., the processor 110 may be in a standby or powered down state). Additionally or alternatively, in some embodiments, the security engine 140 may be embodied as a general-purpose processor distinct from the processor 110 (e.g., a second processor). In operation, the security engine 140 may perform a "secure boot" or a "trusted boot" of the computing device 102. To do so, the security engine 140 includes a secure memory 142, which may be internal or local secured memory, separate from the memory 130. Data stored in the secure memory 142 may be accessible to the security engine 140 and inaccessible to other components of the computing device 102. In some embodiments, the secure memory 142 may be configured to store one or more blocks of the initial boot firmware 136 (e.g., the STAGE-1 firmware 136), which may be retrieved by the security engine 140 from the memory 130. The secure memory 142 may store the blocks of the initial boot firmware 136 according to a first in, first out process in which the next block of initial boot firmware 136 is retrieved and stored in the secure memory 142 after a previously stored block has been copied (e.g., moved, relocated, transmitted, etc.) to another memory (e.g., the CAR 114).

Additionally or alternatively, in some embodiments, the secure memory 142 may include multiple buffers 144, 146 (e.g., the BUFFER_1 144 and the BUFFER_2 146), which may be configured to collectively operate as a "ping-pong buffer." In such embodiments, a block (e.g., a first block) of the initial boot firmware 136 may be stored in a first buffer 144 (e.g., the BUFFER_1 144). During processing of that block (e.g., the first block), another block (e.g., a second block) may be stored in a second buffer 146 (e.g., the BUFFER_2 146). After processing of the first block has been completed, it may be copied (e.g., moved, relocated, transmitted, etc.) from the first buffer 144 (e.g., the BUFFER_1 144) to the CAR 114. The next block (e.g., a third block) may then be stored in the now available first buffer 144 (e.g., the BUFFER_1 144) and processed accordingly. Remaining blocks of the initial boot firmware 136 (e.g., the STAGE-1 firmware 136) may be stored in the buffers 144, 146 (e.g., the BUFFER_1 144 and the BUFFER_2 146) in an alternating fashion based on which buffer 144, 146 is available (e.g., the previously stored block has been copied to the CAR 114). It should be appreciated that although the secure memory 142 illustratively includes two buffers 144, 146 (e.g. the BUFFER_1 144 and the BUFFER_2 146), the secure memory 142 may include any number of buffers (e.g., one buffer, two buffers, three buffers, four buffers, etc.). Additionally or alternatively, the buffers 144, 146 (e.g., the BUFFER_1 144, the BUFFER_2 146, and any other buffers) may be configured to operate as a "ping-pong buffer," a "ring buffer," or according to any other buffering process and/or buffering type.

The communication circuitry 150 of the computing device 102 may be embodied as any type of communication circuit, device, or collection thereof, capable of enabling communications between the computing device 102 and one or more other computing devices. The communication circuitry 150 may be configured to use any one or more communication technologies (e.g., wireless or wired communications) and associated protocols (e.g., Ethernet, Wi-Fi®, WiMAX, etc.) to effect such communication.

The data storage 160 may be embodied as any type of device or devices configured for short-term or long-term storage of data such as, for example, memory devices and circuits, memory cards, hard disk drives, solid-state drives, or other data storage devices. For example, the data storage 160 may be configured to store one or more operating systems to be initialized and/or executed by the computing device 102. In some embodiments, portions of the operating system(s) may be copied to the memory 130 during operations for faster processing and/or any other reason.

Figure 2:
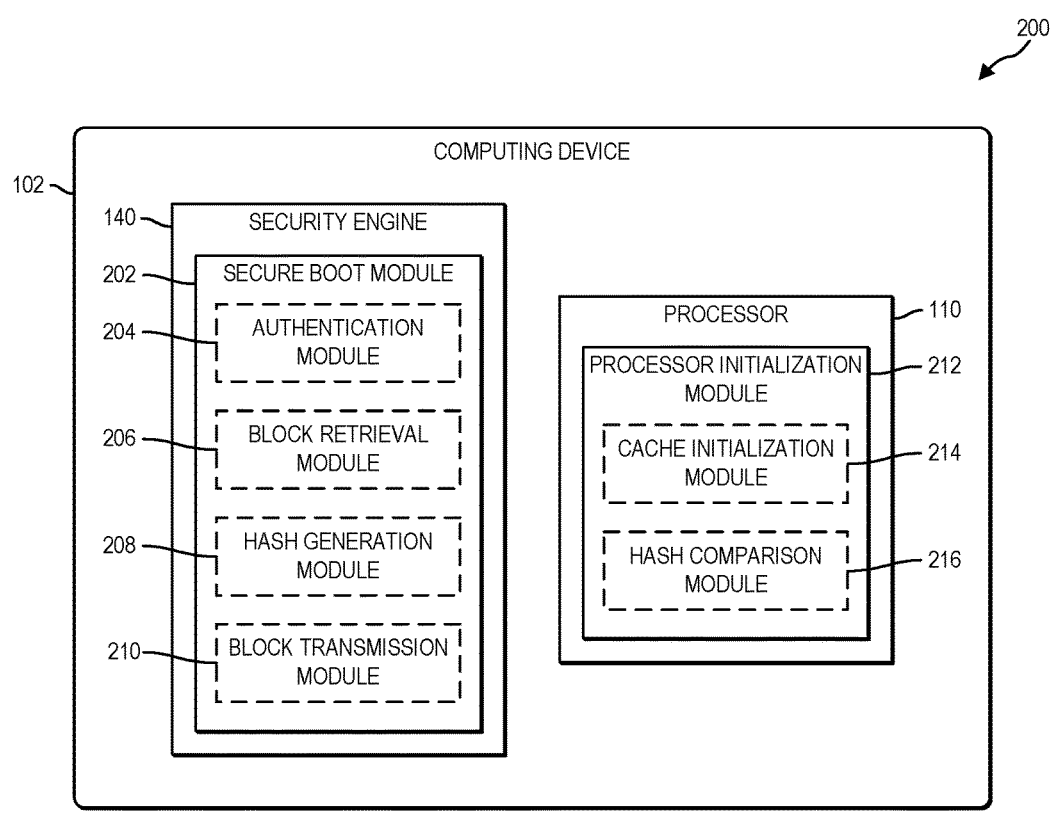
FIG. 2 is a simplified block diagram of at least one embodiment of an environment of the computing device of the system of FIG. 1.

Referring now to FIG. 2, in use, the computing device 102 establishes an environment 200 during operation. The illustrative environment 200 includes a secure boot module 202 and a processor initialization module 212. The secure boot module 202 may be established by the security engine 140 and, in some embodiments, may include an authentication module 204, a block retrieval module 206, a hash generation module 208, and a block transmission module 210. The processor initialization module 212 may be established by the processor 110 and, in some embodiments, may include a cache initialization module 214 and a hash comparison module 216. In some embodiments, the processor initialization module 212 may be established by the processor 110 in response to execution of the authenticated platform initialization firmware 134 (e.g., the STAGE-0 firmware 134) by the processor 110. Each of the modules, logic, and other components of the environment 200 may be embodied as hardware, software, firmware, or a combination thereof. It should be appreciated that the computing device 102 may include other components, sub-components, modules, and devices commonly found in a computing device, which are not illustrated in FIG. 2 for clarity of the description.

The secure boot module 202 may be configured to authenticate the platform initialization firmware 134 (e.g., STAGE-0 firmware 134), which may be embodied as low-level code and/or instructions configured to be executed by the security engine 140 and/or the processor 110 for initializing one or more components of the computing device 102 during initial stages of the booting process (e.g., prior to initialization of hardware components, an operating system, etc.). To do so, the secure boot module 202 may include the authentication module 204. In some embodiments, the authentication module 204 may be configured to retrieve or otherwise obtain the platform initialization firmware 134 (e.g., the STAGE-0 firmware 134) from the memory 130 or other firmware storage of the computing device 102. Additionally, the authentication module 204 may be configured to use any suitable process for authenticating the platform initialization firmware 134. For example, in some embodiments, the authentication module 204 may verify a digital signature associated with the platform initialization firmware 134 and/or compare a hash generated from the platform initialization firmware 134 to a known hash corresponding to a reference (e.g., unmodified, unadulterated, original, etc.) version of the platform initialization firmware 134, In some embodiments, the authentication module 204 may be configured to notify the processor initialization module 212 (or a component thereof) in response to determining that the platform initialization firmware 134 has been authenticated.

As discussed, the memory 130 of the computing device may store initial boot firmware 136 (e.g., STAGE-1 firmware 136), which when executed, causes the processor 110 to complete an initialization process. In some embodiments, the storage size of the initial boot firmware 136 may exceed the amount of storage available or otherwise provided by the secure memory 142 of the security engine 140. As such, to enable a secure boot of the computing device 102, the initial boot firmware 136 may be broken into multiple blocks (e.g., segments, blobs, portions, subsets, etc.). Each block may be smaller in size than the amount of storage available in the secure memory 142 and/or each of the multiple buffers 144, 146 (e.g., the BUFFER_1 144, BUFFER_2 146, etc.). Additionally, each block may be of equal size, relative to each other, in memory. In such embodiments, the secure boot module 202 may be configured to consecutively determine a hash value for each block of the initial boot firmware 136 (e.g., the STAGE-1 firmware 136). To do so, the secure boot module 202 may include the block retrieval module 206, the hash generation module 208, and the block transmission module 210.

The block retrieval module 206 may be configured to consecutively retrieve each block of the initial boot firmware 136 (e.g., the STAGE-1 firmware 136) from the memory 130 or other firmware storage of the computing device 102. In addition, the block retrieval module 206 may be configured to store the retrieved blocks in the secure memory 142 of the security engine 140. In embodiments wherein the secure memory 142 is configured to store the retrieved blocks according to a first in, first out process, the block retrieval module 206 may retrieve and store subsequent blocks of initial boot firmware 136 after the previous block of initial boot firmware 136 has been copied out of the secure memory 142 and into the CAR 114. In embodiments wherein the secure memory 142 includes multiple buffers 144, 146 (e.g., the BUFFER_1 144 and the BUFFER_2 146) configured to operate as a "ping-pong buffer," the block retrieval module 206 may consecutively retrieve and store the blocks of initial boot firmware 136 based on which buffer 144, 146 is available (e.g., the previously stored block has been copied to the CAR 114). In such embodiments, the block retrieval module 206 may retrieve each subsequent block from the memory 130 contemporaneously with the processing of a previous block currently stored in one of the buffers 144, 146 (e.g., the BUFFER_1 144 or the BUFFER_2 146).

The hash generation module 208 may be configured to generate a hash value for each block of initial boot firmware 136 (e.g., the STAGE-1 firmware 136) retrieved from the memory 130 and subsequently stored in the secure memory 142. To do so, the hash generation module 208 may apply a cryptographic hash function to each block to determine a corresponding hash value. In some embodiments, the cryptographic hash function may be embodied as a secure hash algorithm (e.g., SHA-0, SHA-1, SHA-2, SHA-3, etc.). However, it should be appreciated that the cryptographic hash function may be embodied as any other type of function or algorithm for verifying the integrity of the initial boot firmware 136 (e.g., the STAGE-1 firmware 136).

Additionally, the hash generation module 208 may be configured to generate an aggregated hash value based on the hash values generated for each of the blocks of initial boot firmware 136 (e.g., the STAGE-1 firmware 136). To do so, the hash generation module 208 may add the determined hash values together (e.g., generate a total sum of the hash values, etc.) to generate the aggregated hash value. As discussed, the aggregated hash value may be compared to a known (e.g., pre-determined, pre-computed, reference, etc.) hash value and/or checksum corresponding to the initial boot firmware 136.

The block transmission module 210 may be configured to copy (e.g., move, relocate, transmit, etc.) each block of initial boot firmware 136 out of the secure memory 142 and into the CAR 114 after the corresponding hash value has been generated. In some embodiments, the block transmission module 210 may be configured to clear (e.g., reset, wipe, delete, etc.) a block of the initial boot firmware 136 from the secure memory 142 and/or the buffers 144, 146 (e.g., the BUFFER_1 144 or the BUFFER_2 146) in response to the block being copied to the CAR 114. It should be appreciated that by copying each block of the initial boot firmware 136 out of the secure memory 142 and/or the buffers 144, 146 after the corresponding hash value has been generated, the secure memory 142 is made available to store another block (e.g., the next block). As discussed, in some embodiments, the processor 110 rather than the security engine 140 may copy (e.g., retrieve, move, relocate, transmit, obtain, etc.) each block of initial boot firmware 136 out of the secure memory 142 and into the CAR 114 after the corresponding hash value has been generated. In such embodiments, the processor initialization module 212 rather than the secure boot module 202 may include the block transmission module 210.

The processor initialization module 212 may be configured to initialize all or a portion of the processor 110 based on firmware received or otherwise obtained from the secure boot module 202. For example, in some embodiments, the processor initialization module 212 may be configured to retrieve the platform initialization firmware 134 (e.g., STAGE-0 firmware 134) from the secure memory 142, which was authenticated by the authentication module 204. In such embodiments, the processor initialization module 212 may enable basic and/or reduced functionality for the processor 110 as defined by the platform initialization firmware 134.

The processor initialization module 212 may also be configured to initialize all or a portion of the cache memory 112 of the processor 110 to be used for storage of data and/or variables needed during the booting process prior to initialization of the memory 130 (e.g., the main device memory). To do so, in some embodiments, the processor initialization module 212 may include the cache initialization module 214. The cache initialization module 214 may be configured to initialize all or a portion of the cache memory 112 of the processor 110 to be used as Cache as RAM (CAR) 114. As discussed above, the CAR 114 may be used to store the blocks of the initial boot firmware 136 (e.g., the STAGE-1 firmware 136) after the hash generation module 208 has determined the corresponding hash values.

Additionally, in some embodiments, the processor initialization module 212 may be configured to copy (e.g., retrieve, move, relocate, transmit, etc.) each block of initial boot firmware 136 (e.g., the STAGE-1 firmware 136) out of the secure memory 142 and into the CAR 114 after the corresponding hash value has been generated. In such embodiments, the processor initialization module 212 rather than the secure boot module 202 may include the block transmission module 210. In some embodiments, the block transmission module 210 of the processor initialization module 212 may copy (e.g., retrieve, move, relocate, transmit, obtain, etc.) each block of the initial boot firmware 136 out of the secure memory 142 and into the CAR 114 in response to receiving a message (e.g., a signal or any other type of notification) from the security engine 140 (or a component thereof) that generation of a corresponding hash value has been completed.

The processor initialization module 212 may also be configured compare the aggregated hash value to a reference hash value (e.g., a pre-computed hash value, a pre-determined hash value, a known hash value, etc.) corresponding to the initial boot firmware 136 (e.g., the STAGE-1 firmware 136). To do so, the processor initialization module 212 may include the hash comparison module 216. The hash comparison module 216 may be configured to determine whether the aggregated hash value matches, or is otherwise substantially similar to or within a pre-defined (e.g., reference) tolerance of, the reference hash value or checksum value. That is, the hash comparison module 216 may determine whether the aggregated hash value matches a known good hash or checksum value corresponding to an unadulterated (e.g., unmodified, original, etc.) version of the initial boot firmware 136 (e.g., the STAGE-1 firmware 136).

In some embodiments, the processor initialization module 212 may also be configured to complete initialization of the processor 110 in response to a determination by the hash comparison module 216 that the aggregated hash value matches, or is otherwise substantially similar to or within a pre-defined (e.g., reference) tolerance of, the reference (e.g., pre-computed, pre-determined, known, etc.) hash value or checksum value. In such embodiments, full operation and/or functionality of the processor 110 may be enabled and additional components (e.g., hardware components, peripheral devices, operating systems, etc.) of the computing device may be initialized. Additionally or alternatively, the processor initialization module 212 may also be configured to perform one or more security functions based on a determination that the aggregated hash value does not match, or is otherwise not substantially similar to or within a pre-defined (e.g., reference) tolerance of, the reference hash value or checksum value. For example, in some embodiments, the processor initialization module 212 may perform one or more security functions that cause the computing device 102 to shut down or reboot in response to determining that the aggregated hash value does not match the reference hash value or checksum value. Additionally or alternatively, the processor initialization module 212 may perform one or more security functions that disable the computing device 102 and/or one or more components or services of the computing device 102 in response to determining that the aggregated hash value does not match the reference hash value or checksum value. It should be appreciated that the processor initialization module 212 may perform any other type of security function in response to determining that the aggregated hash value does not match the reference hash value or checksum value.

Figure 3:
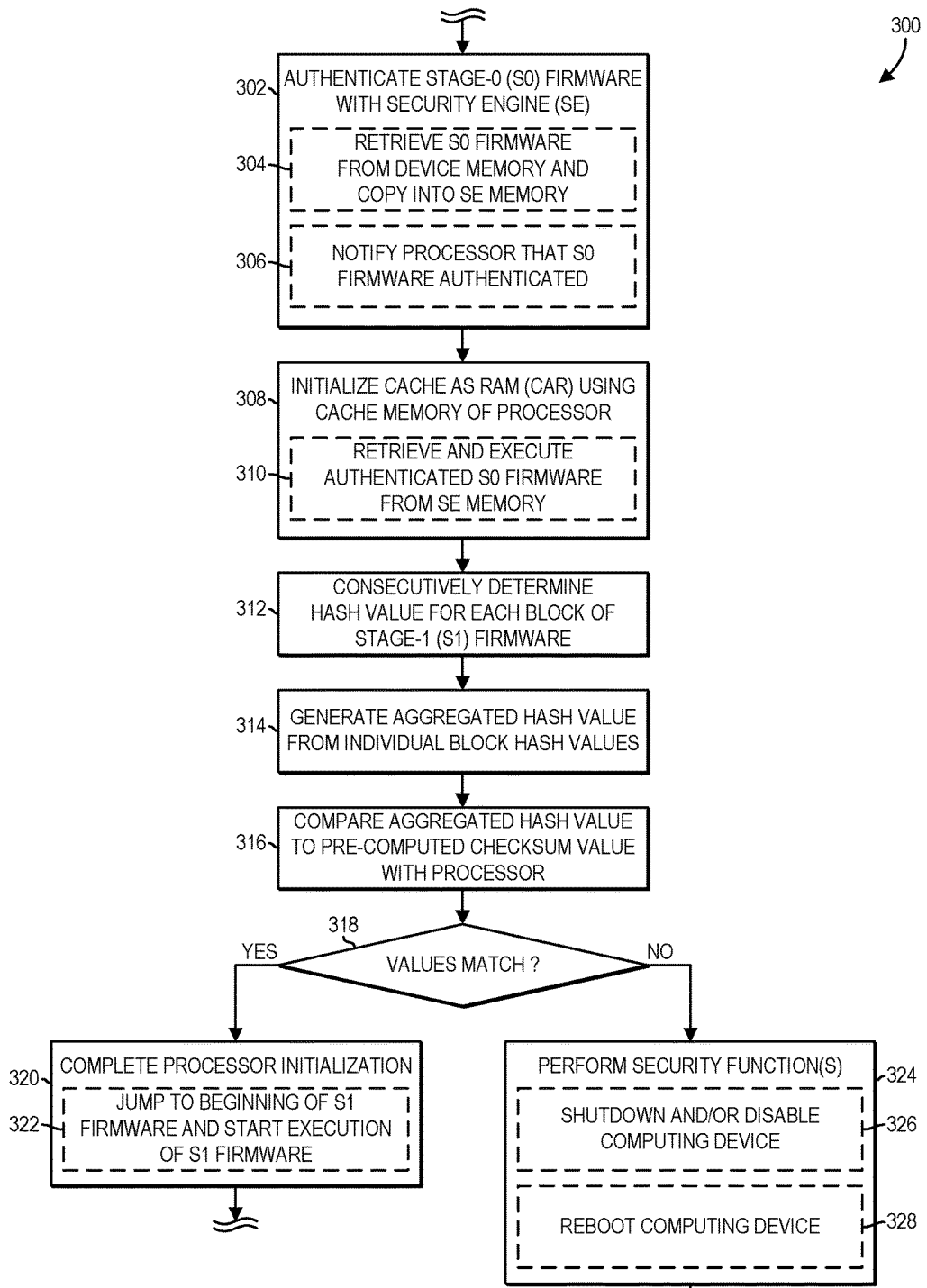
FIG. 3 is a simplified flow diagram of at least one embodiment of a method for performing a secure boot that may be executed by the computing device of FIGS. 1 and 2.

Referring now to FIG. 3, the computing device 102 may execute a method 300 for performing a secure boot. The method 300 begins with block 302 in which the security engine 140 of the computing device 102 authenticates the platform initialization firmware 134 (e.g., the STAGE-0 firmware 134). The platform initialization firmware 134 may be embodied as low-level code and/or instructions configured to be executed by the security engine 140 and/or the processor 110 for initializing one or more components of the computing device 102 during initial stages of the booting process (e.g., prior to initialization of hardware components, an operating system, etc.). For example, in some embodiments, the platform initialization firmware 134 may be configured to enable the processor 110 to initialize a portion of the cache memory 112 as CAR 114. Additionally, the platform initialization firmware 134 may also be configured to enable the processor 110 to copy (e.g., retrieve, move, relocate, obtain, etc.) one or more blocks of initial boot firmware 136 (e.g., STAGE-1 firmware 136) from the secure memory 142 of the security engine 140 and into the CAR 114. In operation, the security engine 140 may use any suitable process for authenticating the platform initialization firmware 134. For example, in some embodiments, the security engine 140 may verify a digital signature associated with the platform initialization firmware 134 and/or compare a hash generated from the platform initialization firmware 134 to a reference (e.g., pre-computed, pre-determined, known, etc.) hash value corresponding to an original (e.g., unmodified, unadulterated, etc.) version of the platform initialization firmware 134. In some embodiments, in block 304, the security engine 140 retrieves the platform initialization firmware 134 (e.g., the STAGE-0 firmware 134) from the memory 130 of the computing device 102. Upon retrieving the platform initialization firmware 134 from the memory 130, the security engine 140 stores the platform initialization firmware 134 in the secure memory 142. In some embodiments, in block 306, the security engine 140 may also notify the processor 110 that the platform initialization firmware 134 has been authenticated.

In block 308, the processor 110 of the computing device 102 initializes a portion of the cache memory 112 as Cache as RAM (CAR) 114. To do so, the processor 110 may execute the authenticated platform initialization firmware 134. The CAR 114 may be used by components of the computing device 102 to store data and/or variables needed during the booting process prior to complete initialization of the memory 130 (e.g., the main device memory). In some embodiments, in block 310, the processor 110 may retrieve the authenticated platform initialization firmware 134 from the secure memory 142 of the security engine 140. In such embodiments, the processor 110 may retrieve the authenticated platform initialization firmware 134 in response to receiving a notification from the security engine 140.

In block 312, the security engine 140 may consecutively determine a hash value for each block of the initial boot firmware 136 (e.g., the STAGE-1 firmware 136). As discussed, the initial boot firmware 136 may be initially stored in the memory 130 of the computing device 102 and may be configured to enable initialization of the processor 110 to be completed. In some embodiments, the storage size of the initial boot firmware 136 may exceed the amount of storage available or otherwise provided by the secure memory 142 of the security engine 140 and/or one or more of the buffers 144, 146 (e.g., the BUFFER_1 144 and the BUFFER_2 146). As such, to enable a secure boot of the computing device 102, the initial boot firmware 136 may be broken into multiple blocks (e.g., segments, blobs, portions, subsets, etc.). Each block may be smaller in size than the amount of storage available in the secure memory 142 and/or one or more of the buffers 144, 146. In such embodiments, a cryptographic hash function may be applied to each block to determine a corresponding hash value. In some embodiments, the cryptographic hash function may be embodied as a secure hash algorithm (e.g., SHA-0, SHA-1, SHA-2, SHA-3, etc.). However, it should be appreciated that the cryptographic hash function may be embodied as any other type of function or algorithm for verifying the integrity of the initial boot firmware 136 (e.g., the STAGE-1 firmware 136).

Figure 4:
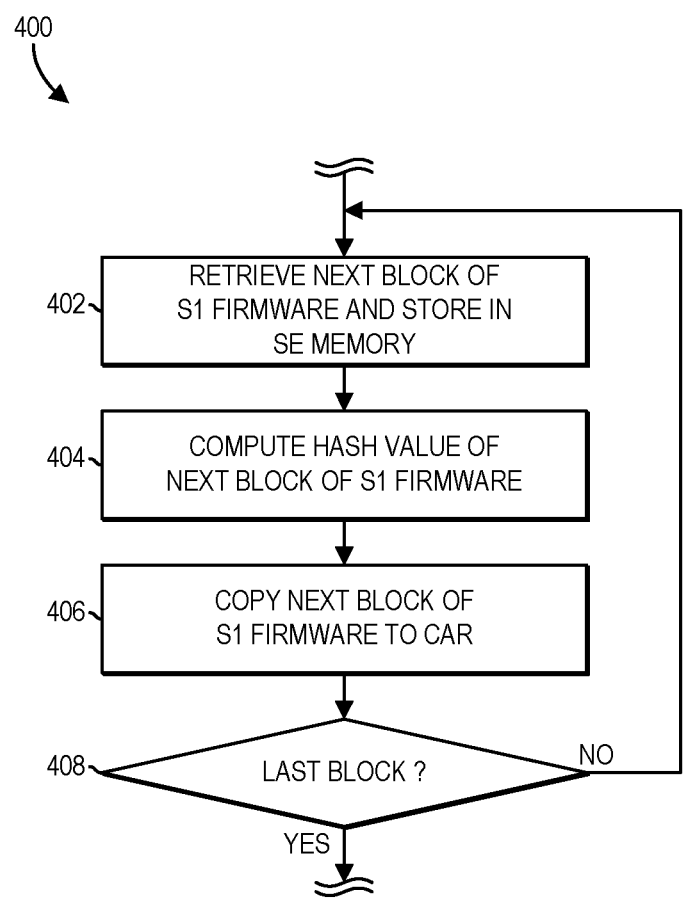
FIG. 4 is a simplified flow diagram of at least one embodiment of a subroutine of the method of FIG. 3 for consecutively determining a hash value for blocks of initial boot firmware that may be executed by the computing device of FIGS. 1 and 2.

In some embodiments, the security engine 140 may consecutively determine the hash value for each block of the initial boot firmware 136 (e.g., the STAGE-1 firmware 136) using a first in, first out process. In such embodiments, the secure memory 142 of the security engine 140 may be configured to store a single block of initial boot firmware 136 at any given time. As such, the next block of initial boot firmware 136 will not be retrieved and copied to the secure memory 142 until the previously stored block has been copied to the CAR 114 by the security engine 140 or the processor 110. For example, referring now to FIG. 4, the computing device 102 may execute a method 400 for consecutively determining the hash value for each block of the initial boot firmware 136 (e.g., the STAGE-1 firmware 136). The method 400 begins with block 402 in which the security engine 140 of the computing device 102 retrieves the next block of the initial boot firmware 136 from the memory 130 and stores it in the secure memory 142. It should be appreciated that during the first iteration of the method 400, the security engine 140 may retrieve the first block of the initial boot firmware 136 from the memory 130 and store it in the secure memory 142.

In block 404, the security engine 140 then computes and/or determines a hash value of the first/next block of the initial boot firmware 136 stored in the secure memory 142. To do so, the security engine 140 may apply a cryptographic hash function to the first/next block to generate a corresponding hash value. As discussed, each block may be smaller in size than the amount of storage available in the secure memory 142. Additionally, in some embodiments, each of the blocks of the initial boot firmware 136 may be of an equal size in memory. As a consequence, in such embodiments, the hash values generated for each of the blocks may be of an equal size as well. It should be appreciated, however, that hash values of blocks having different sizes may also be generated.

In block 406, the security engine 140 or the processor 110 may copy (e.g., retrieve, move, relocate, transmit, obtain, etc.) the first/next block of the initial boot firmware 136 out of the secure memory 142 and into the CAR 114. In some embodiments, the security engine 140 and/or the processor 110 may be configured to clear (e.g., reset, wipe, delete, etc.) the first/next block of the initial boot firmware 136 from the secure memory 142 so that the secure memory 142 is available to store the next block (e.g., a subsequent block) of the initial boot firmware 136 retrieved from the memory 130.

In decision block 408, the security engine 140 determines whether the first/next block of the initial boot firmware 136 copied from the secure memory 142 to the CAR 114 is the last block of the initial boot firmware 136. That is, the security engine 140 may determine whether there are any remaining blocks of the initial boot firmware 136 that still need to be retrieved from the memory 130, stored in the secure memory 142, have a corresponding hash value generated therefrom, and copied to the CAR 114. If, in decision block 408, the security engine 140 determines that the first/next block is not the last block of initial boot firmware 136, the method 400 loops back to block 402 to retrieve the next block (e.g., the subsequent block) of initial boot firmware 136 from the memory 130 for storage in the secure memory 142. If, however, the security engine 140 instead determines in decision block 408 that the first/next block is the last block of initial boot firmware 136, the method 400 ends and processing continues with block 314 of FIG. 3.

Figure 5:
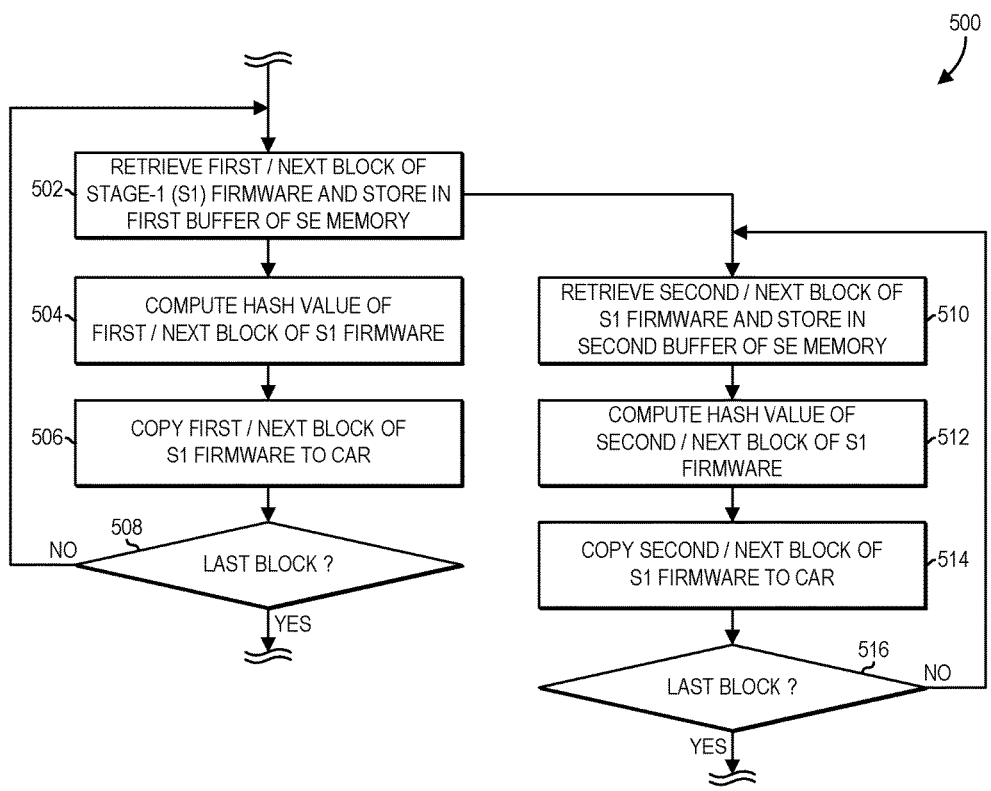
FIG. 5 is a simplified flow diagram of at least one other embodiment of a subroutine of the method of FIG. 3 for consecutively determining a hash value for blocks of initial boot firmware that may be executed by the computing device of FIGS. 1 and 2.

Additionally or alternatively, in some embodiments, the security engine 140 may consecutively determine the hash value for each block of the initial boot firmware 136 (e.g., the STAGE-1 firmware 136) using multiple buffers 144, 146 (e.g., the BUFFER_1 144 and the BUFFER_2 146) of the secure memory 142. In such embodiments, each buffer 144, 146 (e.g., the BUFFER_1 144 and the BUFFER_2 146) of the secure memory 142 may each be configured to store a single block of initial boot firmware 136 at any given time. For example, referring now to FIG. 5, the computing device 102 may execute a method 500 for consecutively determining the hash value for each block of the initial boot firmware 136 (e.g., the STAGE-1 firmware 136) using the multiple buffers 144, 146 of the secure memory 142. The method 500 begins with block 502 in which the security engine 140 of the computing device 102 retrieves the first/next block of the initial boot firmware 136 from the memory 130 and stores it in a first buffer 144 (e.g., the BUFFER_1 144) of the secure memory 142.

In block 504, the security engine 140 then computes and/or determines a hash value of the first/next block of the initial boot firmware 136 stored in the first buffer 144 (e.g., the BUFFER_1 144). To do so, the security engine 140 may apply a cryptographic hash function to the first/next block to generate a corresponding hash value. In some embodiments, each block may be smaller in size than the amount of storage available in each of the buffers 144, 146 of the secure memory 142. Additionally, in some embodiments, each of the blocks of initial boot firmware 136 may be of an equal size in memory. As a consequence, in such embodiments, the hash values generated for each of the blocks may be of an equal size as well. It should be appreciated, however, that hash values of blocks having different sizes may also be generated.

In block 506, the security engine 140, or the processor 110 in some embodiments, may copy (e.g., retrieve, move, relocate, transmit, obtain, etc.) the first/next block of the initial boot firmware 136 out of the first buffer 144 (e.g., the BUFFER_1 144) and into the CAR 114. In some embodiments, the security engine 140 and/or the processor 110 may be configured to clear (e.g., reset, wipe, delete, etc.) the first/next block of the initial boot firmware 136 from the first buffer 144 so that the first buffer 144 is available again to store another block (e.g., a subsequent block) of the initial boot firmware 136 retrieved from the memory 130.

In decision block 508, the security engine 140 determines whether the first/next block of the initial boot firmware 136 copied from the first buffer 144 to the CAR 114 is the last block of initial boot firmware 136. That is, the security engine 140 may determine whether there are any remaining blocks of the initial boot firmware 136 that still need to be retrieved from the memory 130, stored in an available buffer 144, 146 of the secure memory 142, have a corresponding hash value generated therefrom, and copied to the CAR 114. If, in decision block 508, the security engine 140 determines that the first/next block is not the last block of initial boot firmware 136, the method 500 loops back to block 502 to retrieve another block (e.g., a third block, a next block, a subsequent block, etc.) of initial boot firmware 136 from the memory 130 for storage in the first buffer 144. If, however, the security engine 140 instead determines in decision block 508 that the first/next block is the last block of initial boot firmware 136, the method 500 ends and processing continues with block 314 of FIG. 3.

In some embodiments, in block 510, the security engine 140 retrieves a second/next block of the initial boot firmware 136 from the memory 130 and stores it in a second buffer 146 (e.g., the BUFFER_2 146) of the secure memory 142. It should be appreciated that computing device 102 and/or the security engine 140 may execute block 510 contemporaneously with block 504. That is, the security engine 140 may retrieve the second block of the initial boot firmware 136 from the memory 130 and store it in the second buffer 146 at the same time or an overlapping time as when the hash value of the first block stored in the first buffer 146 is determined. The method 500 then advances to block 512.

In block 512, the security engine 140 then computes and/or determines a hash value of the second/next block of the initial boot firmware 136 stored in the second buffer 146 (e.g., the BUFFER 2146). To do so, the security engine 140 may apply the cryptographic hash function to the second/next block to generate a corresponding hash value. The method 500 then advances to block 514 in which the security engine 140 or the processor 110 copies (e.g., retrieves, moves, relocates, transmits, obtains, etc.) the second/next block of the initial boot firmware 136 out of the second buffer 146 (e.g., the BUFFER 2146) and into the CAR 114. In some embodiments, the security engine 140 and/or the processor 110 may be configured to clear (e.g., reset, wipe, delete, etc.) the second/next block of the initial boot firmware 136 from the second buffer 146 so that the second buffer 146 is available again to store another block (e.g., a next block or a subsequent block) of the initial boot firmware 136 retrieved from the memory 130.

In decision block 516, the security engine 140 determines whether the second/next block of the initial boot firmware 136 copied from the second buffer 146 to the CAR 114 is the last block of initial boot firmware 136. That is, the security engine 140 may determine whether there are any remaining blocks of the initial boot firmware 136 that still need to be retrieved from the memory 130, stored in an available buffer 144, 146 of the secure memory 142, have a corresponding hash value generated therefrom, and copied to the CAR 114. If, in decision block 516, the security engine 140 determines that the second/next block is not the last block of initial boot firmware 136, the method 500 loops back to block 510 to retrieve another block (e.g., a fourth block, a next block, a subsequent block, etc.) of initial boot firmware 136 from the memory 130 for storage in the second buffer 146. If, however, the security engine 140 instead determines in decision block 516 that the second/next block is the last block of initial boot firmware 136, the method 500 ends and processing continues with block 314 of FIG. 3.

Referring back to FIG. 3, in block 314, the security engine 140 may generate an aggregated hash value from the hash values generated for each of the blocks of initial boot firmware 136 (e.g., the STAGE-1 firmware 136). To do so, the hash generation module 208 may add the determined hash values together (e.g., generate a total sum of the hash values, etc.) to generate the aggregated hash value. The hash generation module 208 may use any suitable process to add the determined hash value together.

In block 316, the processor 110 compares the aggregated hash value to a reference (e.g., pre-determined, pre-computed, known, etc.) hash value or checksum value corresponding to the initial boot firmware 136 (e.g., the STAGE-1 firmware 136). The method 300 advances to decision block 318 in which the processor 110 determines whether the aggregated hash value matches, or is otherwise substantially similar to or within a pre-defined (e.g., reference) tolerance of, the reference hash value or checksum value corresponding to the initial boot firmware 136. If, in decision block 318, the processor 110 determines that the aggregated hash value matches, or is otherwise substantially similar to or within a pre-defined (e.g., reference) tolerance of, the reference hash value or checksum value, the method 300 advances to block 320. If, however, the processor 110 determines instead that the aggregated hash value does not match, or is not otherwise substantially similar to or within a pre-defined (e.g., reference) tolerance of, the reference hash value or checksum value, the method 300 advances to block 324.

In block 320, initialization of the processor 110 may be completed in response to determining that the aggregated hash value matches the reference (e.g., known, pre-computed, pre-determined, etc.) hash value and/or checksum value for the initial boot firmware 136 (e.g., STAGE-1 firmware 136). For example, in block 322, the processor may jump to the beginning of the initial boot firmware 136 (e.g., the STAGE-1 firmware 136) stored in the CAR 114 and begin execution therefrom. In doing so, full operation of the processor 110 may be enabled.

In block 324, the processor 110 performs one or more security functions based on the determination that the aggregated hash value does not match the reference (e.g., known, pre-computed, pre-determined, etc.) hash value or checksum value for the initial boot firmware 136 (e.g., STAGE-1 firmware 136). For example, in block 326, the processor 110 may shutdown and/or disable the computing device 102 or any component thereof. Additionally or alternatively, in block 328, the processor 110 may reboot the computing device 102 in response to such a determination.

EXAMPLES

Illustrative examples of the technologies disclosed herein are provided below. An embodiment of the technologies may include any one or more, and any combination of, the examples described below.

Example 1 includes a computing device to perform a secure boot, the computing device including a security engine of the computing device including a secure boot module to: (i) consecutively determine a hash value for each block of a plurality of blocks of initial boot firmware, wherein to consecutively determine the hash values includes to (a) retrieve each block of the plurality of blocks from a memory of the computing device, (b) store each retrieved block in a secure memory of the security engine, and (c) determine the hash value for each block stored in the secure memory; and (ii) generate an aggregated hash value from the hash value determined for each block of the initial boot firmware; and a processor including a Cache as RAM and a processor initialization module to (i) compare the aggregated hash value to a reference checksum value associated with the initial boot firmware to determine whether the aggregated hash value matches the reference checksum value and (ii) complete initialization of the processor in response to a determination that the aggregated hash value matches the reference checksum value, wherein the secure boot module or the processor initialization module to copy each block stored in the secure memory to the Cache as RAM of the processor.

Example 2 includes the subject matter of Example 1, and wherein the security engine includes a security coprocessor different from the processor of the computing device.

Example 3 includes the subject matter of any of Examples 1 and 2, and wherein to determine the hash value for each block stored in the secure memory includes to determine the hash value each block stored in the secure memory with a cryptographic hash function.

Example 4 includes the subject matter of any of Examples 1-3, and wherein the cryptographic hash function includes a secure hash algorithm.

Example 5 includes the subject matter of any of Examples 1-4, and wherein each block of the plurality of blocks of the initial boot firmware is of equal size in memory.

Example 6 includes the subject matter of any of Examples 1-5, and wherein each block of the plurality of blocks of the initial boot firmware has a size in memory less than or equal to a memory storage capacity of the secure memory of the security engine.

Example 7 includes the subject matter of any of Examples 1-6, and wherein to complete initialization of the processor initialization includes to (i) jump to a beginning of the initial boot firmware stored in the Cache as RAM and (ii) execute the initial boot firmware.

Example 8 includes the subject matter of any of Examples 1-7, and wherein the secure boot module further to transmit the aggregated hash value to the processor.

Example 9 includes the subject matter of any of Examples 1-8, and wherein the processor further to perform security functions in response to a determination that the aggregated hash value does not match the reference checksum value.

Example 10 includes the subject matter of any of Examples 1-9, and wherein to perform security functions includes to at least one of shut down the computing device, disable the computing device, or reboot the computing device.

Example 11 includes the subject matter of any of Examples 1-10, and wherein the secure boot module further to authenticate platform initialization firmware for the computing device; and wherein the processor further to execute the authenticated platform initialization firmware to initialize a portion of a cache memory of the processor as the Cache as RAM.

Example 12 includes the subject matter of any of Examples 1-11, and wherein to authenticate the platform initialization firmware includes to (i) retrieve the platform initialization firmware from the memory of the computing device and (ii) notify the processor that the platform initialization firmware is authenticated.

Example 13 includes the subject matter of any of Examples 1-12, and wherein the processor further to retrieve the authenticated platform initialization firmware from the secure memory of the security engine; and wherein to execute the authenticated platform initialization firmware includes to execute the authenticated platform initialization firmware retrieved from the secure memory of the security engine.

Example 14 includes the subject matter of any of Examples 1-13, and wherein the initial boot firmware includes a stage-1 boot loader; and wherein the platform initialization firmware includes a stage-0 boot loader executed by the processor prior to execution of the stage-1 boot loader.

Example 15 includes the subject matter of any of Examples 1-14, and wherein to consecutively determine the hash value for each block of the plurality of blocks of initial boot firmware includes to: (i) retrieve a first block of the plurality of blocks of initial boot firmware from the memory of the computing device, (ii) store the retrieved first block of the initial boot firmware in the secure memory of the security engine, (iii) determine a first hash value that corresponds to the first block of the initial boot firmware stored in the secure memory, (iv) retrieve a second block of the plurality of blocks of initial boot firmware from the memory of the computing device in response to storage of the first block of the initial boot firmware in the Cache as RAM, (v) store the retrieved second block of the initial boot firmware in the secure memory of the security engine, and (vi) determine a second hash value that corresponds to the second block of the initial boot firmware stored in the secure memory; wherein to copy each block stored in the secure memory to the Cache as RAM includes to (i) copy the first block of the initial boot firmware stored in the secure memory to the Cache as RAM in response to determination of the first hash value and (ii) copy the second block of the initial boot firmware stored in the secure memory to the Cache as RAM in response to determination of the second hash value; and wherein to generate the aggregated hash value includes to generate the aggregated hash value from the determined first and second hash values.

Example 16 includes the subject matter of any of Examples 1-15, and wherein the secure boot module further to determine whether the second block of the initial boot firmware is a last block of the plurality of blocks of the initial boot firmware.

Example 17 includes the subject matter of any of Examples 1-16, and wherein in response to a determination that the second block of the initial boot firmware is not the last block: (i) the secure boot module further to (a) consecutively retrieve each remaining block of the plurality of blocks of the initial boot firmware and (b) determine a hash value for each remaining block retrieved and (ii) the secure boot module or the processor initialization module to copy each remaining block retrieved to the Cache as RAM; and wherein to generate the aggregated hash value includes to generate the aggregated hash value from the determined first hash value, the determined second hash value, and the hash value determined for each of the remaining blocks retrieved.

Example 18 includes the subject matter of any of Examples 1-17, and wherein to generate the aggregated hash value includes to generate the aggregated hash value in response to a determination that the second block of the initial boot firmware is the last block.

Example 19 includes the subject matter of any of Examples 1-18, and wherein to consecutively determine the hash value for each block of the plurality of blocks of initial boot firmware includes to: (i) retrieve a first block of the plurality of blocks of initial boot firmware from the memory of the computing device, (ii) store the retrieved first block of the initial boot firmware in a first buffer of the secure memory of the security engine, (iii) determine a first hash value that corresponds to the first block of the initial boot firmware stored in the first buffer of the secure memory, (iv) retrieve a second block of the plurality of blocks of initial boot firmware from the memory of the computing device contemporaneous with a determination of the first hash value that corresponds to the first block of the initial boot firmware, (v) store the retrieved second block of the initial boot firmware in a second buffer of the secure memory of the security engine, and (vi) determine a second hash value that corresponds to the second block of the initial boot firmware stored in the second buffer of the secure memory; wherein to copy each block stored in the secure memory to the Cache as RAM includes to (i) copy the first block of the initial boot firmware stored in the first buffer of the secure memory to the Cache as RAM in response to determination of the first hash value and (ii) copy the second block of the initial boot firmware stored in the second buffer of the secure memory to the Cache as RAM in response to determination of the second hash value; and wherein to generate the aggregated hash value includes to generate the aggregated hash value from the determined first and second hash values.

Example 20 includes a method for securely booting a computing device, the method including consecutively determining, by a security engine of the computing device, a hash value for each block of a plurality of blocks of initial boot firmware, wherein consecutively determining the hash values includes (i) retrieving each block of the plurality of blocks from a memory of the computing device, (ii) storing each retrieved block in a secure memory of the security engine, and (iii) determining the hash value for each block stored in the secure memory; copying, by the security engine or a processor of the computing device, each block stored in the secure memory to a Cache as RAM of the processor; generating, by the security engine, an aggregated hash value from the hash value determined for each block of the initial boot firmware; comparing, by the processor, the aggregated hash value to a reference checksum value associated with the initial boot firmware to determine whether the aggregated hash value matches the reference checksum value; and completing initialization of the processor in response to a determination that the aggregated hash value matches the reference checksum value.

Example 21 includes the subject matter of Example 20, and wherein the security engine includes a security coprocessor different from the processor of the computing device.

Example 22 includes the subject matter of any of Examples 20 and 21, and wherein determining the hash value for each block stored in the secure memory includes determining the hash value each block stored in the secure memory with a cryptographic hash function.

Example 23 includes the subject matter of any of Examples 20-22, and wherein the cryptographic hash function includes a secure hash algorithm.

Example 24 includes the subject matter of any of Examples 20-23, and wherein each block of the plurality of blocks of the initial boot firmware is of equal size in memory.

Example 25 includes the subject matter of any of Examples 20-24, and wherein each block of the plurality of blocks of the initial boot firmware has a size in memory less than or equal to a memory storage capacity of the secure memory of the security engine.

Example 26 includes the subject matter of any of Examples 20-25, and wherein completing initialization of the processor initialization includes (i) jumping to a beginning of the initial boot firmware stored in the Cache as RAM and (ii) executing the initial boot firmware.

Example 27 includes the subject matter of any of Examples 20-26, and further including transmitting, by the security engine, the aggregated hash value to the processor.

Example 28 includes the subject matter of any of Examples 20-27, and further including performing security functions in response to a determination that the aggregated hash value does not match the reference checksum value.

Example 29 includes the subject matter of any of Examples 20-28, and wherein performing security functions includes at least one of shutting down the computing device, disabling the computing device, or rebooting the computing device.

Example 30 includes the subject matter of any of Examples 20-29, and further including: authenticating, by the security engine, platform initialization firmware for the computing device; and executing, by the processor, the authenticated platform initialization firmware to initialize a portion of a cache memory of the processor as the Cache as RAM.

Example 31 includes the subject matter of any of Examples 20-30, and wherein authenticating the platform initialization firmware includes (i) retrieving the platform initialization firmware from the memory of the computing device and (ii) notifying the processor that the platform initialization firmware is authenticated.

Example 32 includes the subject matter of any of Examples 20-31, and further including retrieving, by the processor, the authenticated platform initialization firmware from the secure memory of the security engine; and wherein executing the authenticated platform initialization firmware includes executing the authenticated platform initialization firmware retrieved from the secure memory of the security engine.

Example 33 includes the subject matter of any of Examples 20-32, and wherein the initial boot firmware includes a stage-1 boot loader; and wherein the platform initialization firmware includes a stage-0 boot loader executed by the processor prior to execution of the stage-1 boot loader.

Example 34 includes the subject matter of any of Examples 20-33, and wherein consecutively determining the hash value for each block of the plurality of blocks of initial boot firmware includes: (i) retrieving a first block of the plurality of blocks of initial boot firmware from the memory of the computing device, (ii) storing the retrieved first block of the initial boot firmware in the secure memory of the security engine, (iii) determining a first hash value corresponding to the first block of the initial boot firmware stored in the secure memory, (iv) retrieving a second block of the plurality of blocks of initial boot firmware from the memory of the computing device in response to storage of the first block of the initial boot firmware in the Cache as RAM, (v) storing the retrieved second block of the initial boot firmware in the secure memory of the security engine, and (vi) determining a second hash value corresponding to the second block of the initial boot firmware stored in the secure memory; wherein copying each block stored in the secure memory to the Cache as RAM includes (i) copying the first block of the initial boot firmware stored in the secure memory to the Cache as RAM in response to determination of the first hash value and (ii) copying the second block of the initial boot firmware stored in the secure memory to the Cache as RAM in response to determination of the second hash value; and wherein generating the aggregated hash value includes generating the aggregated hash value from the determined first and second hash values.

Example 35 includes the subject matter of any of Examples 20-34, and further including determining whether the second block of the initial boot firmware is a last block of the plurality of blocks of the initial boot firmware.

Example 36 includes the subject matter of any of Examples 20-35, wherein in response to a determination that the second block of the initial boot firmware is not the last block: (i) consecutively retrieving, by the security engine, each remaining block of the plurality of blocks of the initial boot firmware and determining a hash value for each remaining block retrieved and (ii) copying, by the security engine or the processor, each remaining block retrieved to the Cache as RAM; and wherein generating the aggregated hash value includes generating the aggregated hash value from the determined first hash value, the determined second hash value, and the hash value determined for each of the remaining blocks retrieved.

Example 37 includes the subject matter of any of Examples 20-36, wherein generating the aggregated hash value includes generating the aggregated hash value in response to a determination that the second block of the initial boot firmware is the last block.

Example 38 includes the subject matter of any of Examples 20-37, and wherein consecutively determining the hash value for each block of the plurality of blocks of initial boot firmware includes: (i) retrieving a first block of the plurality of blocks of initial boot firmware from the memory of the computing device, (ii) storing the retrieved first block of the initial boot firmware in a first buffer of the secure memory of the security engine, (iii) determining a first hash value corresponding to the first block of the initial boot firmware stored in the first buffer of the secure memory, (iv) retrieving a second block of the plurality of blocks of initial boot firmware from the memory of the computing device contemporaneous with determining the first hash value corresponding to the first block of the initial boot firmware, (v) storing the retrieved second block of the initial boot firmware in a second buffer of the secure memory of the security engine, and (vi) determining a second hash value corresponding to the second block of the initial boot firmware stored in the second buffer of the secure memory; wherein copying each block stored in the secure memory to the Cache as RAM includes (i) copying the first block of the initial boot firmware stored in the first buffer of the secure memory to the Cache as RAM in response to determination of the first hash value and (ii) copying the second block of the initial boot firmware stored in the second buffer of the secure memory to the Cache as RAM in response to determination of the second hash value; and wherein generating the aggregated hash value includes generating the aggregated hash value from the determined first and second hash values.

Example 39 includes a computing device to perform a secure boot, the computing device including a processor; and a memory having stored therein a plurality of instructions that when executed by the processor cause the computing device to perform the method of any of Examples 20-38.

Example 40 includes one or more machine-readable media including a plurality of instructions stored thereon that in response to being executed result in a computing device performing the method of any of Examples 20-38.

Example 41 includes a computing device to perform a secure boot, the computing device including: means for consecutively determining, by a security engine of the computing device, a hash value for each block of a plurality of blocks of initial boot firmware, wherein the means for consecutively determining the hash values includes: (i) means for retrieving each block of the plurality of blocks from a memory of the computing device, (ii) means for storing each retrieved block in a secure memory of the security engine, and (iii) means for determining the hash value for each block stored in the secure memory; means for copying, by the security engine or a processor of the computing device, each block stored in the secure memory to a Cache as RAM of the processor; means for generating, by the security engine, an aggregated hash value from the hash value determined for each block of the initial boot firmware; means for comparing, by the processor, the aggregated hash value to a reference checksum value associated with the initial boot firmware to determine whether the aggregated hash value matches the reference checksum value; and means for completing initialization of the processor in response to a determination that the aggregated hash value matches the reference checksum value.

Example 42 includes the subject matter of Example 41, and wherein the security engine includes a security coprocessor different from the processor of the computing device.

Example 43 includes the subject matter of any of Examples 41 and 42, and wherein the means for determining the hash value for each block stored in the secure memory includes means for determining the hash value each block stored in the secure memory with a cryptographic hash function.

Example 44 includes the subject matter of any of Examples 41-43, and wherein the cryptographic hash function includes a secure hash algorithm.

Example 45 includes the subject matter of any of Examples 41-44, and wherein each block of the plurality of blocks of the initial boot firmware is of equal size in memory.

Example 46 includes the subject matter of any of Examples 41-45, and wherein each block of the plurality of blocks of the initial boot firmware has a size in memory less than or equal to a memory storage capacity of the secure memory of the security engine.

Example 47 includes the subject matter of any of Examples 41-46, and wherein the means for completing initialization of the processor initialization includes (i) means for jumping to a beginning of the initial boot firmware stored in the Cache as RAM and (ii) means for executing the initial boot firmware.

Example 48 includes the subject matter of any of Examples 41-47, and further including means for transmitting, by the security engine, the aggregated hash value to the processor.

Example 49 includes the subject matter of any of Examples 41-48, and further including means for performing security functions in response to a determination that the aggregated hash value does not match the reference checksum value.

Example 50 includes the subject matter of any of Examples 41-49, and wherein the means for performing security functions includes means for at least one of shutting down the computing device, disabling the computing device, or rebooting the computing device.

Example 51 includes the subject matter of any of Examples 41-50, and further including: means for authenticating, by the security engine, platform initialization firmware for the computing device; and means for executing, by the processor, the authenticated platform initialization firmware to initialize a portion of a cache memory of the processor as the Cache as RAM.

Example 52 includes the subject matter of any of Examples 41-51, and wherein the means for authenticating the platform initialization firmware includes (i) means for retrieving the platform initialization firmware from the memory of the computing device and (ii) means for notifying the processor that the platform initialization firmware is authenticated.

Example 53 includes the subject matter of any of Examples 41-52, and further including means for retrieving, by the processor, the authenticated platform initialization firmware from the secure memory of the security engine; and wherein the means for executing the authenticated platform initialization firmware includes means for executing the authenticated platform initialization firmware retrieved from the secure memory of the security engine.

Example 54 includes the subject matter of any of Examples 41-53, and wherein the initial boot firmware includes a stage-1 boot loader; and wherein the platform initialization firmware includes a stage-0 boot loader executed by the processor prior to execution of the stage-1 boot loader.

Example 55 includes the subject matter of any of Examples 41-54, and wherein the means for consecutively determining the hash value for each block of the plurality of blocks of initial boot firmware includes: (i) means for retrieving a first block of the plurality of blocks of initial boot firmware from the memory of the computing device, (ii) means for storing the retrieved first block of the initial boot firmware in the secure memory of the security engine, (iii) means for determining a first hash value corresponding to the first block of the initial boot firmware stored in the secure memory, (iv) means for retrieving a second block of the plurality of blocks of initial boot firmware from the memory of the computing device in response to storage of the first block of the initial boot firmware in the Cache as RAM, (v) means for storing the retrieved second block of the initial boot firmware in the secure memory of the security engine, and (vi) means for determining a second hash value corresponding to the second block of the initial boot firmware stored in the secure memory; wherein the means for copying each block stored in the secure memory to the Cache as RAM includes: (i) means for copying the first block of the initial boot firmware stored in the secure memory to the Cache as RAM in response to determination of the first hash value and (ii) means for copying the second block of the initial boot firmware stored in the secure memory to the Cache as RAM in response to determination of the second hash value; and wherein the means for generating the aggregated hash value includes means for generating the aggregated hash value from the determined first and second hash values.

Example 56 includes the subject matter of any of Examples 41-55, and further including means for determining whether the second block of the initial boot firmware is a last block of the plurality of blocks of the initial boot firmware.

Example 57 includes the subject matter of any of Examples 41-56, and wherein in response to a determination that the second block of the initial boot firmware is not the last block, the computing device further including: (i) means for consecutively retrieving, by the security engine, each remaining block of the plurality of blocks of the initial boot firmware, (ii) means for determining, by the security engine, a hash value for each remaining block retrieved, and (iii) means for copying, by the security engine or the processor, each remaining block retrieved to the Cache as RAM; and wherein the means for generating the aggregated hash value includes means for generating the aggregated hash value from the determined first hash value, the determined second hash value, and the hash value determined for each of the remaining blocks retrieved.

Example 58 includes the subject matter of any of Examples 41-57, and wherein the means for generating the aggregated hash value includes means for generating the aggregated hash value in response to a determination that the second block of the initial boot firmware is the last block.

Example 59 includes the subject matter of any of Examples 41-58, and wherein the means for consecutively determining the hash value for each block of the plurality of blocks of initial boot firmware includes: (i) means for retrieving a first block of the plurality of blocks of initial boot firmware from the memory of the computing device, (ii) means for storing the retrieved first block of the initial boot firmware in a first buffer of the secure memory of the security engine, (iii) means for determining a first hash value corresponding to the first block of the initial boot firmware stored in the first buffer of the secure memory, (iv) means for retrieving a second block of the plurality of blocks of initial boot firmware from the memory of the computing device contemporaneous with determining the first hash value corresponding to the first block of the initial boot firmware, (v) means for storing the retrieved second block of the initial boot firmware in a second buffer of the secure memory of the security engine, and (vi) means for determining a second hash value corresponding to the second block of the initial boot firmware stored in the second buffer of the secure memory; wherein the means for copying each block stored in the secure memory to the Cache as RAM includes (i) means for copying the first block of the initial boot firmware stored in the first buffer of the secure memory to the Cache as RAM in response to determination of the first hash value and (ii) means for copying the second block of the initial boot firmware stored in the second buffer of the secure memory to the Cache as RAM in response to determination of the second hash value; and wherein the means for generating the aggregated hash value includes means for generating the aggregated hash value from the determined first and second hash values.

The invention claimed is:

1. A computing device to perform a secure boot, the computing device comprising:
 a security engine of the computing device comprising a secure boot module to: (i) consecutively determine a hash value for each block of a plurality of blocks of initial boot firmware, wherein to consecutively determine the hash values comprises to (a) retrieve each block of the plurality of blocks from a memory of the computing device, (b) store each retrieved block in a secure memory of the security engine, and (c) determine the hash value for each block stored in the secure memory; and (ii) generate an aggregated hash value from the hash value determined for each block of the initial boot firmware; and a processor comprising a Cache as RAM and a processor initialization module to (i) compare the aggregated hash value to a reference checksum value associated with the initial boot firmware to determine whether the aggregated hash value matches the reference checksum value and (ii) complete initialization of the processor in response to a determination that the aggregated hash value matches the reference checksum value, wherein the secure boot module or the processor initialization module to copy each block stored in the secure memory to the Cache as RAM of the processor.

2. The computing device of claim 1, wherein to determine the hash value for each block stored in the secure memory comprises to determine the hash value each block stored in the secure memory with a cryptographic hash function.

3. The computing device of claim 1, wherein each block of the plurality of blocks of the initial boot firmware is of equal size in memory.

4. The computing device of claim 1, wherein each block of the plurality of blocks of the initial boot firmware has a size in memory less than or equal to a memory storage capacity of the secure memory of the security engine.

5. The computing device of claim 1, wherein to complete initialization of the processor initialization comprises to (i) jump to a beginning of the initial boot firmware stored in the Cache as RAM and (ii) execute the initial boot firmware.

6. The computing device of claim 1, wherein the secure boot module further to transmit the aggregated hash value to the processor.

7. The computing device of claim 1, wherein the processor further to perform security functions in response to a determination that the aggregated hash value does not match the reference checksum value.

8. The computing device of claim 7, wherein to perform security functions comprises to at least one of shut down the computing device, disable the computing device, or reboot the computing device.

9. The computing device of claim 1, wherein the secure boot module further to authenticate platform initialization firmware for the computing device; and wherein the processor further to (i) retrieve the authenticated platform initialization firmware from the secure memory of the security engine and (ii) execute the authenticated platform initialization firmware retrieved from the secure memory of the security engine to initialize a portion of a cache memory of the processor as the Cache as RAM.

10. The computing device of claim 9, wherein to authenticate the platform initialization firmware further comprises to (i) retrieve the platform initialization firmware from the memory of the computing device and (ii) notify the processor that the platform initialization firmware is authenticated.

11. The computing device of claim 9, wherein the initial boot firmware comprises a stage-1 boot loader; and wherein the platform initialization firmware comprises a stage-0 boot loader executed by the processor prior to execution of the stage-1 boot loader.

12. The computing device of claim 1, wherein to consecutively determine the hash value for each block of the plurality of blocks of initial boot firmware comprises to: (i) retrieve a first block of the plurality of blocks of initial boot firmware from the memory of the computing device, (ii) store the retrieved first block of the initial boot firmware in the secure memory of the security engine, (iii) determine a first hash value that corresponds to the first block of the initial boot firmware stored in the secure memory, (iv) retrieve a second block of the plurality of blocks of initial boot firmware from the memory of the computing device in response to storage of the first block of the initial boot firmware in the Cache as RAM, (v) store the retrieved second block of the initial boot firmware in the secure memory of the security engine, and (vi) determine a second hash value that corresponds to the second block of the initial boot firmware stored in the secure memory;

wherein to copy each block stored in the secure memory to the Cache as RAM comprises to (i) copy the first block of the initial boot firmware stored in the secure memory to the Cache as RAM in response to determination of the first hash value and (ii) copy the second block of the initial boot firmware stored in the secure memory to the Cache as RAM in response to determination of the second hash value; and wherein to generate the aggregated hash value comprises to generate the aggregated hash value from the determined first and second hash values.

13. The computing device of claim 12, wherein the secure boot module further to determine whether the second block of the initial boot firmware is a last block of the plurality of blocks of the initial boot firmware.

14. The computing device of claim 13, wherein in response to a determination that the second block of the initial boot firmware is not the last block: (i) the secure boot module further to (a) consecutively retrieve each remaining block of the plurality of blocks of the initial boot firmware and (b) determine a hash value for each remaining block retrieved and (ii) the secure boot module or the processor initialization module to copy each remaining block retrieved to the Cache as RAM; and wherein to generate the aggregated hash value comprises to generate the aggregated hash value from the determined first hash value, the determined second hash value, and the hash value determined for each of the remaining blocks retrieved.

15. The computing device of claim 13, wherein to generate the aggregated hash value comprises to generate the aggregated hash value in response to a determination that the second block of the initial boot firmware is the last block.

16. The computing device of claim 1, wherein to consecutively determine the hash value for each block of the plurality of blocks of initial boot firmware comprises to: (i) retrieve a first block of the plurality of blocks of initial boot firmware from the memory of the computing device, (ii) store the retrieved first block of the initial boot firmware in a first buffer of the secure memory of the security engine, (iii) determine a first hash value that corresponds to the first block of the initial boot firmware stored in the first buffer of the secure memory, (iv) retrieve a second block of the plurality of blocks of initial boot firmware from the memory of the computing device contemporaneous with a determination of the first hash value that corresponds to the first block of the initial boot firmware, (v) store the retrieved second block of the initial boot firmware in a second buffer of the secure memory of the security engine, and (vi) determine a second hash value that corresponds to the second block of the initial boot firmware stored in the second buffer of the secure memory;

wherein to copy each block stored in the secure memory to the Cache as RAM comprises to (i) copy the first block of the initial boot firmware stored in the first buffer of the secure memory to the Cache as RAM in response to determination of the first hash value and (ii) copy the second block of the initial boot firmware stored in the second buffer of the secure memory to the Cache as RAM in response to determination of the second hash value; and wherein to generate the aggregated hash value comprises to generate the aggregated hash value from the determined first and second hash values.

17. One or more non-transitory, machine-readable media comprising a plurality of instructions stored thereon that in response to being executed by a computing device, cause the computing device to:

consecutively determine, by a security engine of the computing device, a hash value for each block of a plurality of blocks of initial boot firmware, wherein to consecutively determine the hash values comprises to (i) retrieve each block of the plurality of blocks from a memory of the computing device, (ii) store each retrieved block in a secure memory of the security engine, and (iii) determine the hash value for each block stored in the secure memory;

copy, by the security engine or a processor of the computing device, each block stored in the secure memory to a Cache as RAM of the processor;

generate, by the security engine, an aggregated hash value from the hash value determined for each block of the initial boot firmware;

compare, by the processor, the aggregated hash value to a reference checksum value associated with the initial boot firmware to determine whether the aggregated hash value matches the reference checksum value; and complete initialization of the processor in response to a determination that the aggregated hash value matches the reference checksum value.

18. The one or more non-transitory, machine-readable media of claim 17, wherein the plurality of instructions further cause the computing device to: (i) authenticate, by the security engine, platform initialization firmware for the computing device; (ii) retrieve, by the processor, the authenticated platform initialization firmware from the secure memory of the security engine; and (iii) execute, by the processor, the authenticated platform initialization firmware retrieved from the secure memory of the security engine to initialize a portion of a cache memory of the processor as the Cache as RAM; and wherein to complete initialization of the processor initialization comprises to (i) jump to a beginning of the initial boot firmware stored in the Cache as RAM and (ii) execute the initial boot firmware.

19. The one or more non-transitory, machine-readable media of claim 17, wherein the plurality of instructions further cause the computing device to perform security functions in response to a determination that the aggregated hash value does not match the reference checksum value.

20. The one or more non-transitory, machine-readable media of claim 17, wherein to consecutively determine the hash value for each block of the plurality of blocks of initial boot firmware comprises to: (i) retrieve a first block of the plurality of blocks of initial boot firmware from the memory of the computing device, (ii) store the retrieved first block of the initial boot firmware in the secure memory of the security engine, (iii) determine a first hash value that corresponds to the first block of the initial boot firmware stored in the secure memory, (iv) retrieve a second block of the plurality of blocks of initial boot firmware from the memory of the computing device in response to storage of the first block of the initial boot firmware in the Cache as RAM, (v) store the retrieved second block of the initial boot firmware in the secure memory of the security engine, and (vi) determine a second hash value that corresponds to the second block of the initial boot firmware stored in the secure memory;

wherein to copy each block stored in the secure memory to the Cache as RAM comprises to (i) copy the first block of the initial boot firmware stored in the secure memory to the Cache as RAM in response to determination of the first hash value and (ii) copy the second block of the initial boot firmware stored in the secure memory to the Cache as RAM in response to determination of the second hash value; and wherein to generate the aggregated hash value comprises to generate the aggregated hash value from the determined first and second hash values.

21. The one or more non-transitory, machine-readable media of claim 17, wherein to consecutively determine the hash value for each block of the plurality of blocks of initial boot firmware comprises to: (i) retrieve a first block of the plurality of blocks of initial boot firmware from the memory of the computing device, (ii) store the retrieved first block of the initial boot firmware in a first buffer of the secure memory of the security engine, (iii) determine a first hash value that corresponds to the first block of the initial boot firmware stored in the first buffer of the secure memory, (iv) retrieve a second block of the plurality of blocks of initial boot firmware from the memory of the computing device contemporaneous with determination of the first hash value that corresponds to the first block of the initial boot firmware, (v) store the retrieved second block of the initial boot firmware in a second buffer of the secure memory of the security engine, and (vi) determine a second hash value that corresponds to the second block of the initial boot firmware stored in the second buffer of the secure memory;

wherein to copy each block stored in the secure memory to the Cache as RAM comprises to (i) copy the first block of the initial boot firmware stored in the first buffer of the secure memory to the Cache as RAM in response to determination of the first hash value and (ii) copy the second block of the initial boot firmware stored in the second buffer of the secure memory to the Cache as RAM in response to determination of the second hash value; and wherein to generate the aggregated hash value comprises to generate the aggregated hash value from the determined first and second hash values.

22. A method for securely booting a computing device, the method comprising:

consecutively determining, by a security engine of the computing device, a hash value for each block of a plurality of blocks of initial boot firmware, wherein consecutively determining the hash values comprises (i) retrieving each block of the plurality of blocks from a memory of the computing device, (ii) storing each retrieved block in a secure memory of the security engine, and (iii) determining the hash value for each block stored in the secure memory;

copying, by the security engine or a processor of the computing device, each block stored in the secure memory to a Cache as RAM of the processor;

generating, by the security engine, an aggregated hash value from the hash value determined for each block of the initial boot firmware;

comparing, by the processor, the aggregated hash value to a reference checksum value associated with the initial boot firmware to determine whether the aggregated hash value matches the reference checksum value; and completing initialization of the processor in response to a determination that the aggregated hash value matches the reference checksum value.

23. The method of claim 22, further comprising:

authenticating, by the security engine, platform initialization firmware for the computing device;

retrieving, by the processor, the authenticated platform initialization firmware from the secure memory of the security engine;

executing, by the processor, the authenticated platform initialization firmware retrieved from the secure memory of the security engine to initialize a portion of a cache memory of the processor as the Cache as RAM; and wherein completing initialization of the processor initialization comprises (i) jumping to a beginning of the initial boot firmware stored in the Cache as RAM and (ii) executing the initial boot firmware.

24. The method of claim 22, wherein consecutively determining the hash value for each block of the plurality of blocks of initial boot firmware comprises: (i) retrieving a first block of the plurality of blocks of initial boot firmware from the memory of the computing device, (ii) storing the retrieved first block of the initial boot firmware in the secure memory of the security engine, (iii) determining a first hash value corresponding to the first block of the initial boot firmware stored in the secure memory, (iv) retrieving a second block of the plurality of blocks of initial boot firmware from the memory of the computing device in response to storage of the first block of the initial boot firmware in the Cache as RAM, (v) storing the retrieved second block of the initial boot firmware in the secure memory of the security engine, and (vi) determining a second hash value corresponding to the second block of the initial boot firmware stored in the secure memory;

wherein copying each block stored in the secure memory to the Cache as RAM comprises (i) copying the first block of the initial boot firmware stored in the secure memory to the Cache as RAM in response to determination of the first hash value and (ii) copying the second block of the initial boot firmware stored in the secure memory to the Cache as RAM in response to determination of the second hash value; and wherein generating the aggregated hash value comprises generating the aggregated hash value from the determined first and second hash values.

25. The method of claim 22, wherein consecutively determining the hash value for each block of the plurality of blocks of initial boot firmware comprises: (i) retrieving a first block of the plurality of blocks of initial boot firmware from the memory of the computing device, (ii) storing the retrieved first block of the initial boot firmware in a first buffer of the secure memory of the security engine, (iii) determining a first hash value corresponding to the first block of the initial boot firmware stored in the first buffer of the secure memory, (iv) retrieving a second block of the plurality of blocks of initial boot firmware from the memory of the computing device contemporaneous with determining the first hash value corresponding to the first block of the initial boot firmware, (v) storing the retrieved second block of the initial boot firmware in a second buffer of the secure memory of the security engine, and (vi) determining a second hash value corresponding to the second block of the initial boot firmware stored in the second buffer of the secure memory;

wherein copying each block stored in the secure memory to the Cache as RAM comprises (i) copying the first block of the initial boot firmware stored in the first buffer of the secure memory to the Cache as RAM in response to determination of the first hash value and (ii) copying the second block of the initial boot firmware stored in the second buffer of the secure memory to the Cache as RAM in response to determination of the second hash value; and wherein generating the aggregated hash value comprises generating the aggregated hash value from the determined first and second hash values.

* * * * *